United States Patent [19]

Vesley et al.

[11] Patent Number: 4,895,745

[45] Date of Patent: Jan. 23, 1990

[54] DARK ACRYLIC PRESSURE-SENSITIVE ADHESIVE

[75] Inventors: George F. Vesley, Hudson, Wis.; Jürgen Klingen, Schwalmtal, Fed. Rep. of Germany

[73] Assignee: Minnesota Mining and Manufacturing Company, St. Paul, Minn.

[21] Appl. No.: 314,227

[22] Filed: Feb. 21, 1989

Related U.S. Application Data

[63] Continuation of Ser. No. 241, Jan. 2, 1987, abandoned.

[51] Int. Cl.$^4$ .............................................. A61F 13/02
[52] U.S. Cl. ...................................... 428/40; 428/220; 428/343.9; 428/317.5; 428/343; 428/355; 428/406
[58] Field of Search .................................. 428/40, 220

[56] References Cited

U.S. PATENT DOCUMENTS

| | | | |
|---|---|---|---|
| Re. 24,906 | 12/1960 | Ulrich | 206/59 |
| 2,859,198 | 11/1958 | Sears | 260/37 |
| 3,024,146 | 3/1962 | Bueche et al. | 428/447 |
| 3,993,608 | 11/1976 | Wells | 260/2.5 AW |
| 4,071,652 | 1/1978 | Brullo | 428/323 |
| 4,163,081 | 7/1979 | Schulz | 428/429 |
| 4,163,091 | 7/1979 | Pettelkau et al. | 526/208 |
| 4,223,067 | 9/1980 | Levens | 428/313.9 |
| 4,287,308 | 9/1981 | Nakayama et al. | 521/53 |
| 4,303,485 | 12/1981 | Levens | 204/159.24 |
| 4,329,384 | 5/1982 | Vesley et al. | 428/40 |
| 4,330,590 | 5/1982 | Vesley | 428/336 |
| 4,364,972 | 12/1982 | Moon | 427/54.1 |
| 4,415,615 | 11/1983 | Esmay et al. | 428/214 X |
| 4,612,242 | 9/1986 | Vesley et al. | 428/313.9 |
| 4,615,472 | 10/1986 | Nash | 226/127 |
| 4,710,536 | 12/1987 | Klingen et al. | 428/343 X |

FOREIGN PATENT DOCUMENTS 747341 11/1966 Canada.
52-133339 11/1977 Japan.

OTHER PUBLICATIONS

"Technical Bulletin Pigments", No. 6 of Degussa Corp., Teterboro, NJ, dated Mar. 1981.
"Precipitated Silicas and Silicates" of Degussa Corp., Teterboro, NJ, dated Dec. 1978.
"Product Information" of Degussa Corp., marked PL/sk 6/4/84.

Primary Examiner—George F. Lesmes
Assistant Examiner—J. Davis
Attorney, Agent, or Firm—Donald M. Sell; Walter N. Kirn; Darla P. Neaveill

[57] ABSTRACT

A pressure-sensitive adhesive tape can be produced by photopolymerization and yet its pressure-sensitive adhesive layer can have a dark appearance when it contains a pigment or dye plus finely divided hydrophobic silica. As compared to a tape which is identical except for omission of the hydrophobic silica, the adhesive layer of the tape is substantially darker and usually of substantially more intense color. Furthermore, the tape exhibits better adhesive properties than do otherwise identical tapes containing no silica. The pressure-sensitive adhesive preferably is an acrylic pressure-sensitive adhesive and may be filled with glass microbubbles which afford a foamlike appearance and character.

16 Claims, No Drawings

DARK ACRYLIC PRESSURE-SENSITIVE ADHESIVE

This is a continuation of application Ser. No. 07/000,241 filed 01/02/87, now abandoned.

CROSS REFERENCE TO RELATED PATENT

The present invention concerns the same problem as that to which U.S. Pat. No. 4,612,242 (Vesley et al.) is directed. Teachings in that patent about microbubbles and about pressure-sensitive adhesives and their photopolymerization are incorporated here by reference.

BACKGROUND OF THE INVENTION

1. Field of the Invention

The invention concerns pressure-sensitive adhesive tape, especially one having a pressure-sensitive adhesive layer which is foamlike by virtue of microbubbles as taught in U.S. Pat. No. 4,223,067 (Levens).

2. Description of the Related Art

Foam-backed pressure-sensitive adhesive tape is commonly used to adhere an article to a substrate. The foam backings of such tapes often are pigmented with carbon black to afford a dark appearance that camouflages their presence.

The pressure-sensitive adhesive tape of the above-cited Levens patent has a foamlike appearance and character, even though it is not a foam, and is useful for porposes previously requiring a foam backed pressure-sensitive adhesive tape. A foamlike tape of the Levens patent now on the market is made by ultraviolet polymerization of a layer of an adhesive-forming mixture containing colorless glass microbubbles which act as a white pigment that makes the tape undesirably visible in uses such as sealing a skylight or attaching body-side moldings to automotive vehicles or simulated mullion bars to glass windows. Because of its superior performance characteristics, the foamlike tape of the Levens patent is often preferred to foam-backed tapes for such purposes and would be more acceptable if its adhesive layer were sufficiently dark to camouflage the tape. If carbon black or other pigment were added to the photopolymerizable adhesive-forming mixture in amounts sufficient to produce a desirably dark appearance, this would block the ultraviolet radiation from polymerizing the mixture to a pressure-sensitive adhesive state. Up to about 0.06 percent by weight of carbon black can be employed without undue interference with the polymerization of a 1.0-mm layer (as evidenced by adhesive and cohesive values), but such small amounts produce only a pastel grey color that would be undesirably noticeable for uses such as those mentioned above. When other pigments are substituted for the carbon black, they also cannot be used in amounts producing a color deeper than pastel.

Although the microbubbles of the Levens patent examples are glass, they can be polymeric of the type described in U.S. Pat. No. 3,651,972 (Morehouse et al.) or U.S. Pat. No. 4,287,308 (Nakayama et al.) Because these polymeric microbubbles are smaller in size and less dense than are commercially available glass microbubbles, a greater number of the polymeric microbubbles is required to attain the same volume loading. Hence, pigmented Levens-type tapes tend to be even lighter colored when filled with polymeric microbubbles than when filled with glass microbubbles.

Also useful for purposes previously requiring a foam-backed pressure-sensitive adhesive tape is the celluar pressure-sensitive adhesive tape disclosed in U.S. Pat. No. 4,415,615 (Esmay et al.). It preferably is made by polymerizing a coated froth in situ by exposure to ultraviolet radiation. Although the use of pigments is suggested (col. 5, lines 48–57), the ultraviolet radiation would be blocked if the froth contained appreciable amounts of carbon black or other pigment.

3. Other Prior Art

Since at least as early as 1941, finely divided silica has been used for the thickening of liquids, usually in a hydrophilic form, but also in hydrophobic form. See, for example, "Technical Bulletin Pigments" No. 6 of Degussa Corp., Teterboro, N.J., dated March 1981, the cover of which shows the schematic structure of a hydrophobic silica. Another Degussa bulletin, "Precipitated Silicas and Silicates" dated Dec. 1978, lists a number of hydrophilic and hydrophobic silicas and gives uses for specific silica products. A 4-page Degussa bulletin entitled "Product Information" marked "PL/sk 6/4/84", indicating the date June 4, 1984, reports that the hydrophobic silica "Aerosil" 972 is made from "Aerosil" 130, a hydrophilic silica which has a surface area of 130 $m^2/g$; the hydrophobic silica "Aerosil" R974 is made from "Aerosil" 200, a hydrophilic silica which has a surface area of 200 $m^2/g$; and the hydrophobic silica "Aerosil" R976 is made from "Aerosil" 300, a hydrophilic silica which has a surface area of 300 $m^2/g$. Because the finer silicas are more difficult to treat, more free hydroxyls remain on the surfaces of the finer silicas, namely 30%, 40%, and 50% on the hydrophobic R972, R974, R976, respectively.

U.S. Pat. No. 3,024,146 (Bueche et al.) concerns a certain silicone rubber composition which contains a hydrophobic silica, specifically a trialkylhalogenosilane-treated silica aerogel, and provides adhesive bonds that better resist repeated freezing and thawing in the presence of water. If one instead employs a silica which has been treated to become hydrophobic by forming silicon-bonded alkoxy groups on the surface of the silica particles, "one will not obtain the same properties or results" (col. 3, lines 26–33). While the adhesives of the examples are pastes, they also can be used as "pressure-sensitive adhesive tapes" (col. 6, lines 10–15, and col. 5, lines 59–70).

No other mention has been found in the prior art concerning the use of hydrophobic silica in pressure-sensitive adhesive tape. The above-cited Levens and Esmay patents employ "fumed silica" in the pressure-sensitive adhesives of their tapes, but "fumed silica" as produced is hydrophilic.

U.S. Pat. No. 4,163,091 (Schulz) teaches that fume(d) silica is a reinforcing filler in certain self-adhesive silicone elastomers, and that the silica "can IO be treated with organosilicon materials such as chlorosilanes, silazanes, alkoxysilanes and cyclic siloxanes to produce hydrophobic surfaces" (col. 6, line 7–52).

DISCLOSURE OF THE INVENTION

Brief Summary of the Invention

The invention provides a pressure-sensitive adhesive tape which can be foamlike as in the above-cited Levens patent, or can have a celluar pressure-sensitive layer like that of the above-cited Esmay patent, and yet can present a sufficiently dark or intensely colored appearance to meet the needs mentioned above. In spite of that dark or colored appearance, these tapes can be produced by photopolymerization and can have adhesive and cohesive properties equal to those of the examples of the Levens and Esmay patents.

The invention also provides a pressure-sensitive adhesive tape wherein the pressure-sensitive adhesive layer is a thin, dense, microbubble-free layer, preferably supported by a flexible carrier that has a release surface from which the pressure-sensitive adhesive layer can be transferred. This microbubble-free pressure-sensitive adhesive layer can be transferred either to a microbubble-filled pressure-sensitive adhesive layer or a celluar pressure-sensitive adhesive layer to provide a pressure-sensitive adhesive composite.

Briefly, the novel pressure-sensitive adhesive tape comprises a flexible support carrying a pressure-sensitive adhesive layer in which is dispersed a pigment or dye plus hydrophobic silica in an amount comprising by weight at least 2 parts per hundred resin (phr), the hydrophobic silica having a surface area of at least 10 $m^2/g$. Preferably, the surface area of the hydrophobic silica is from 50 to 400 $m^2/g$ (B.E T. surface area). As compared to a tape which is identical except for omission of the hydrophobic silica, the novel tape is noticeably darker and more intensely colored. This effect is observed regardless of whether or not the pressure-sensitive adhesive layer of the tape is foamlike, celluar, or dense and microbubble-free. This effect is surprising in view of the fact that hydrophobic silica by itself is white. It also is surprising that the novel tapes exhibit better adhesive and cohesive properties than do otherwise identical tapes containing no silica. Another surprise is that comparable darkening is not achieved when hydrophilic silica is substituted for the hydrophobic silica.

A dark-appearing pressure-sensitive adhesive tape of the invention can be made by the steps of
  (1) preparing a blend of (i) monomers which are photopolymerizable to a pressure-sensitive adhesive state, and (ii) a pigment or dye plus hydrophobic silica having a surface area of at least 10 $m^2/g$ and in an amount comprising by weight at least 2 phr,
  (2) coating the blend onto a carrier, and
  (3) subjecting the coating to ultraviolet radiation to photopolymerize the monomers to pressure-sensitive adhesive state.

Preferably the carrier used in step (2) has a low-adhesion or release surface to permit the resulting pressure-sensitive adhesive layer to be used for such purposes as adhering body side molding to automotive vehicles.

When the coating of step (2) is rather thick (e.g., from 0.5 mm to 1.5 mm in thickness), the necessity of allowing the ultraviolet radiation to penetrate fully makes it impossible to attain colors as dark or intense as might be desired for many purposes In such event, it may be desirable to cover the resulting pressure-sensitive adhesive layer with a relatively thin layer of pressure-sensitive adhesive which preferably has a higher pigment content. When the same pigment or dye is used in both the thin covering and relatively thick under layers, the broad face of the covering layer of the composite tape has a more Intense color than does the face of either layer by itself. Furthermore, the edge of the composite tape appears to present a color which is surprisingly more intense than does the edge of the under layer by itself.

For example, a tape useful for mounting a brake light on the rear window of an automobile may have a grey foamlike pressure-sensitive adhesive core 1 mm in thickness and a black pressure-sensitive adhesive surface layer 0.05 mm in thickness, and after the brake light has been so mounted, the entire pressure-sensitive adhesive composite can have a black appearance.

In the current state of the art, photopolymerization preferably is carried out in an inert atmosphere such as nitrogen. An inert atmosphere can be achieved by temporarily covering the photopolymerizable coating with a plastic film which is transparent to ultraviolet radiation and irradiating through that film in air. If the polymerizable coating is not covered during photopolymerization, the permissible oxygen content of the inert atmosphere can be increased by mixing into the photopolymerizable composition an oxidizable tin compound as taught in U.S. Pat. No. 4,303,485 (Levens), which also teaches that by doing so, thick coatings can be polymerized in air.

A mixture of unpolymerized monomers tends to have such low viscosity that it cannot be coated uniformly at typical thicknesses and so should be partially polymerized to a syrup of coatable viscosity. Preferably, this is done before adding the hydrophobic silica, because the silica is dispersed faster and more easily into a mixture of coatable viscosity. Higher cohesive strengths at 70° C. and better adhesion have been attained at 4–8 parts hydrophobic silica per 100 parts syrup (referred to as "4–8 phr") than at only 2 phr. When the amount of the hydrophobic silica has exceeded 8 phr, it has been necessary to employ a high-shear mixer such as a paint mill to attain uniform dispersions. By doing so useful dispersions have been attained at loadings as high as 15 phr. When the pressure-sensitive adhesive layer is to contain microbubbles, they preferably are added after the hydrophobic silica has been dispersed, because they might be broken in a high-shear mixer.

Tapes of the invention which have been photopolymerized exhibit substantially increased cohesive strengths and adhesion after a period of dwell. This is important for repositioning tapes, but within a few days they normally cannot be removed.

When the pressure-sensitive adhesive layer of the novel tape incorporates microbubbles and is to be photopolymerized, the pigment or dye and the hydrophobic silica are more readily dispersed into the photopolymerizable syrup if added before the microbubbles. The amount of pigment or dye that can be used when microbubbles are to be added to the photopolymerizable syrup is less than when microbubbles are not used, because of the light-scattering effect of the microbubbles. However, larger amounts of pigment or dye can be used than could be used in an identical syrup containing no hydrophobic silica, because the presence of the silica partially offsets the reduction in adhesive and cohesive values due to light-blocking effect of the pigment or dye. Tests indicate that a photopolymerized tape of the invention having a 1.0-mm pressure-sensitive adhesive layer containing microbubbles (average diameter 60 micrometers) can comprise from 0.08 to 0.1% carbon black and exhibit adhesive and cohesive values equivalent to those of an identical tape except containing only 0.06% carbon black and no hydrophobic silica. When the adhesive layer is thinner, larger amounts of pigment or dye can be used. When the microbubbles are of smaller average diameter, it may be necessary to reduce the amount of pigment or dye to maintain good adhesive and cohesive values in a photopolymerized tape of the invention.

While carbon black is preferred when a black color is desired, any pigment or dye of any color should be useful in making tapes of the invention.

Instead of being photopolymerized, tapes of the invention can be made by solution or emulsion polymerization. However, to attain optimum adhesive and cohesive properties, the hydrophobic silica should be added before the polymerization. Because of this, it is presumed that the hydrophobic silica is entering into some sort of interaction (physical or chemical) with monomers during polymerization, although the mechanism is not understood.

The pressure-sensitive adhesive preferably is an "acrylic pressure-sensitive adhesive" comprising at least one copolymer of monomers comprising (a) a major proportion of acrylic acid ester of nontertiary alkyl alcohol, the molecules of which have from 1 to 14 carbon atoms and (b) a minor proportion of at least one copolymerizable monomer having a polar group. When at least a major proportion of said molecules have a carbon-to-carbon chain of 4–12 carbon atoms terminating at the hydroxyl oxygen atom and said chain contains at least about one-half the total number of carbon atoms in the molecule, the copolymer is tacky at ordinary room temperature, as disclosed in U.S. Pat. No. Re. 24,906 (Ulrich). However, the term "acrylic pressure-sensitive adhesive" also encompasses adhesives which are not tacky at room temperatures but become tacky only at elevated temperatures, e.g., acrylic copolymers as described above except that a major proportion of the molecules of monomer (a) have a carbon-to-carbon chain substantially shorter than 4 carbon atoms. The substitution of a methacrylic acid ester for a significant portion of monomer (a) can produce the same result.

Suitable coplymerizable monomers having a polar group include acrylic acid, methacrylic acid, itaconic acid, maleic anhydride, acrylamide, and N-vinyl-2-pyrrolidone. Of these copolymerizable monomers, those having carboxyl groups provide superior cohesive strength and also excellent adhesion to metallic surfaces, but not nearly as good adhesion to low-energy surfaces as does N-vinyl-2-pyrrolidone, as is taught in U.S. Pat. No. 4,364,972 (Moon).

The pressure-sensitive adhesive tape of the invention may have a thick core comprising pressure-sensitive adhesive filled with microbubbles and one or two relatively thin surface layers which are free from microbubbles. Preferably both the core and surface layers of such a composite contain a pigment or dye plus hydrophobic silica. A surface layer of such a composite can be polymerized from solution or emulsion, but its core layer preferably is photopolymerized. Preferably the core layer of such a pressure-sensitive adhesive composite has a thickness from 0.25 to 1.5 mm (typically about 1.0 mm), and each microbubble-free surface layer has a thickness from 0.0125 to 0.25 mm (typically about 0.03 mm).

When a pressure-sensitive adhesive of a tape of the invention has a two layers, one layer comprising copolymer of acrylic acid ester and a carboxyl-containing monomer and the other comprising a copolymer of acrylic acid esters and N-vinyl-2-pyrrolidone monomer, the latter layer of the composite forms strong bonds to low-energy surfaces and the former layer forms strong bonds to high-energy surfaces. When the two layers are formed by simultaneously photopolymerizing two coatings of such monomer mixtures, it is impossible to delaminate the resulting pressure-sensitive adhesive.

To attain high cohesive strengths (as measured either by static shear values at elevated temperatures or by T-Peel at room temperature), the pressure-sensitive adhesive of the novel tape should be crosslinked. preferred crosslinking agents for an acrylic pressure-sensitive adhesive are multiacrylates such as hexanediol diacrylate. Crosslinking is especially easy to control when photopolymerizing the monomer in admixture with a crosslinking agent taught in U.S. Pat. Nos. 4,330,590 (Vesley) and 4,329,384 (Vesley et al.).

When hydrophilic silica has been substituted for hydrophobic silica, less or no improvement has been noted. Furthermore, the use of hydrophilic silica tends to increase significantly the viscosity of the prepolymer compositions, and the consequent higher-shear mixing may be less suitable for large-scale production. Upon adding hydrophilic silica to a composition which is polymerizable to a pressure-sensitive adhesive state, there is a rapid increase in viscosity which greatly limits the coatability of the composition. While the increase in viscosity would limit the amounts of hydrophilic silica to not more than about 2 phr, the addition of up to 6 phr hydrophobic silica produces no significant increase in viscosity.

The following tests may be used to evaluate tapes of the invention.

Static Shear Value at 70° C.

A strip of tape 1.27 cm in width is adhered by its adhesive to a flat, rigid stainless steel plate with an exactly 1.27-cm length of tape in contact with the panel. Before testing, a 1000-g weight rests over the bonded area for 15 minutes. Then the panel with the adhered tape is placed in an air-circulating oven which has been preheated to 70° C., and after 15 minutes, a 500-g weight is hung from the free end of the tape, with the panel tilted 2° from the vertical to insure against any peel forces. The time at which the weight falls is the "Static Shear Value at 70° C.". If no failure, the test is discontinued at 10,000 minutes.

T-Peel

T-peel is measured as in ASTM D-1876-72 except that the test tapes were 0.5 inch (1.27 cm) in width and were tested only two hours after being adhered to aluminum foil backings. Results are reported in Newtons per decimeter (N/dm). Only cohesive failures are reported.

T-peel provides a quantitative value of cohesive strength and is less sensitive to differences in the adhesion of the pressure-sensitive adhesive to the test surface.

180° Peel

The adhesive layer to be tested is slit to a width of 0.5 inch (1.27 cm) and is self-adhered to a clean smooth stainless steel plate. A 0.5-inch wide strip of pressure-sensitive adhesive on a nonstretchable backing is laid onto the adhesive layer to be tested. This composite is subjected to the weight of a 5.58-kg hard rubber-covered steel roller, 3 passes in each direction. After dwelling at 23° C. for one hour (or 72 hours where indicated), the "180° Peel" is measured by moving the free end of the tape away from the steel plate a rate of about 0.5 cm per second (using a tensile tester).

90° Peel

The adhesive layer to be tested is slit to a width of 0.5 inch (1.27 cm) and self adhered to a clean smooth stainless steel plate. A 0.5-inch wide strip of aluminu foil is adhered to the exposed face of the adhesive layer under the weight of a 5.58-kg hard rubber-covered steel roller, 1 pass in each direction. After dwelling at 23° C. for 20 minutes, (or 72 hours where indicated), the "90° Peel" is measured by moving the free end of the tape away from the steel plate a rate of about 0.5 cm per second (using a tensile tester).

Darkness

The darkness of a pressure-sensitive adhesive layer is determined on a Hunter LabScan Spectrocolorimeter using a 10° reflectance, Illum=D65 and the CIE lab scale $L^* a^* b^*$) where $L^*=0$ for black and $L^*=100$ for white. Since $a^*$ and $b^*$ for black samples are usually between $=5$ and $+5$, they are not reported unless one of them is outside of that range.

Carbon Black Pigments

Three carbon black pigments have been used. Pigment A is 27% solids dispersed in phenoxy ethyl acrylate and is a mixture of two carbon blacks having respective average diameters of 27 and 62 nanometers. Pigment B is 50 nanometers in average diameter particle size and dispersed in binder and volatile solvent (28.5% solids). Pigment C is 75 nanometers in average diameter particle size and dispersed in a 2000 molecular weight diol (20% solids).

In the following examples, parts are given by weight. The glass microbubbles used in Examples A–E and G–K had a true density of 0.15 g/cm$^3$ and were 20–150 micrometers in diameter (average 55 micrometers).

EXAMPLE A

A syrup of coatable viscosity was prepared by partially photopolymerizing, as taught in U.S. Pat. No. 4,330,590 (Vesley), a mixture of 87.5 parts isooctyl acrylate, 12.5 parts acrylic acid, and 0.04 part of 2,2-dimethyl-2-phenyl acetophenone ("Irgacure" 651). To each aliquot of this syrup was added an additional 0.1 part of "Irgacure" 651, 0.05 part of hexanedioldiacrylate, 7 parts of glass microbubbles, 4 parts of hydrophobic silica (Degussa "Aerosil" 972), and an amount of Pigment A. Each of the resulting mixtures was thoroughly mixed slowly with an air stirrer and carefully degassed in a desiccator using a vacuum pump. The glass microbubbles comprised about 33% by volume of each mixture.

Each mixture was fed into the nip of a knife coater between a pair of transparent, biaxially oriented poly(ethylene terephthalate) films, the facing surfaces of which had low-adhesion coatings. The knife coater was adjusted to provide a coating thickness of approximately 0.10 to 0.12 mm. The composite emerging from the knife coater was irradiated with a bank of fluorescent lamps, 90% of the emissions of which were between 300 and 400 nm with a maximum at 351 nm. The exposure was measured by a Dynachem Radiometer which is spectrally responsive between 300 and 400 nm, maximum 350 nm. Each side of the coating was exposed to a total radiation of 400–410 millijoules. This total does not include the irradiation adsorbed by the poly(ethylene terephthalate) films. The composite was cooled by blowing air against both films during the irradiation to keep the temperature of the film below 85° C. to avoid wrinkling of the films. The resulting pressure-sensitive adhesive tapes are called Tapes 1–7 in Table I. To provide 0.034 part of carbon black in Tape 1, 0.125 part of Pigment A was used.

Comparative Example A

A series of comparative pressure-sensitive adhesive tapes were prepared as in Example A except omitting the hydrophobic silica from each aliquot. The resulting tapes are called Tapes 1C–7C in Table I.

Another comparative pressure-sensitive adhesive tape was prepared as in Example A, duplicating Tape 1 except for omitting the carbon black, and called Tape 1O in Table I. Another comparative tape duplicated Tape 1 except omitting both the carbon black and the hydrophobic silica and is called Tape 1-X.

TABLE I

| TAPE NO. | CARBON BLACK (phr) | DARKNESS L* | COLOR | T-PEEL (N/dm) | 180° PEEL (N/dm) |
|---|---|---|---|---|---|
| 1 | 0.034 | 43 | GREY | 383 | 164 |
| 2 | 0.06 | 34 | GREY | 383 | 219 |
| 3 | 0.07 | 32 | DARK GREY | 361 | 183 |
| 4 | 0.08 | 30 | DARK GREY | 346 | 199 |
| 5 | 0.10 | 26 | DARK GREY | 295 | 179 |
| 6 | 0.12 | 23 | DARK GREY | 254 | 116 |
| 7 | 0.16 | 19 | BLACK | 249 | 129 |
| 1-C | 0.034 | 48 | GREY | 350 | 149 |
| 2-C | 0.06 | 38 | GREY | 324 | 182 |
| 3-C | 0.07 | 36 | DARK GREY | 324 | 158 |
| 4-C | 0.08 | 31 | DARK GREY | 280 | 173 |
| 5-C | 0.10 | 28 | DARK GREY | 252 | 182 |
| 6-C | 0.12 | 26 | DARK GREY | 219 | 142 |
| 7-C | 0.16 | 25 | BLACK | 208 | 105 |
| 1-O | 0 | 93 | WHITE | 438 | 171 |
| 1-X | 0 | 94 | WHITE | 372 | 153 |

Each of Tapes No. 7 and 7-C had a Static Shear Value at 70° C. greater than 10,000 minutes.

EXAMPLE B

Pressure-sensitive adhesive Tapes 8–12 were made as in Example A except that to each aliquot of the syrup was added 0.07 phr of the carbon black, and the amount of the hydrophobic silica was as indicated in Table II. Also, the hydrophobic silica was dispersed in each aliquot of syrup before adding the glass microbubbles.

Comparative pressure-sensitive adhesive Tape 8-C is identical to Tape 8 except for omission of the hydrophobic silica.

Testing of Tapes 8–12 and 8-C as reported in Table II include 180° Peel after 72 hours dwell.

Comparative Tape 18-C was identical except omitting hydrophobic silica. Test results are in Table III.

TABLE II

| TAPE NO. | HYDROPHOBIC SILICA (phr) | DARKNESS L* | COLOR | T-PEEL (N/dm) | 180° PEEL (N/dm) | 180° PEEL AFTER 72 HRS (N/dm) |
|---|---|---|---|---|---|---|
| 8 | 1 | 34 | DARK GREY | 333 | 140 | 218 |
| 9 | 2 | 33 | DARK GREY | 337 | 149 | 279 |
| 10 | 4 | 32 | DARK GREY | 361 | 133 | 296 |
| 11 | 8 | 31 | DARK GREY | 403 | 193 | 312 |
| 12 | 12 | 29 | DARK GREY | 416 | 190 | 348 |
| 8-C | 0 | 36 | DARK GREY | 324 | 158 | 218 |

Each of the tapes of Table II had a Static Shear Value at 70° C. greater than 10,000 minutes.

EXAMPLE C

Pressure-sensitive adhesive Tape 13 was made as in Example A except that Pigment A was replaced by 0.04 phr Pigment B.

Comparative pressure-sensitive adhesive Tape 13-C was identical to Tape 13 except omitting the hydrophobic silica. Test results are in Table III.

EXAMPLE D

Pressure-sensitive adhesive Tape 14 was made as in Example A except that Pigment A was replaced by 0.07 phr of Pigment C.

Comparative pressure-sensitive adhesive Tape 14-C was identical to Tape 14 except omitting the hydrophobic silica. In the test results shown in Table III, the T-Peel and 180° Peel for both Tape 14 and Tape 14-C were somewhat lower than is normally desired due to reduced transmission of the ultraviolet radiation resulting from the darker color obtained with Pigment C as compared to Pigment A. Hence, this carbon black preferably is not used in amounts exceedin 0.05 phr.

EXAMPLE E

Pressure-sensitive adhesive Tapes 15–17 were made as in Example A except substituting the following pigments or dye for the carbon black.

| Tape | |
|---|---|
| 15 | Quinacridone violet, 0.93 phr of a 15% dispersion of the pigment in isobornyl acrylate |
| 16 | Crystal violet dye, 0.11 phr |
| 17 | "L13-LB Suncure" blue base (Sun Chemical Corp.), 0.5 phr |

Comparative pressure-sensitive adhesive Tapes 15-C, 16-C, and 17-C were identical to Tapes 15–17, respectively, except omitting the hydrophobic silica. See Table III.

EXAMPLE F

Pressure-sensitive adhesive Tape 18 was made as in Example A except using 0.034 phr of carbon black and replacing the colorless glass microbubbles with stained glass microbubbles made from a glass containing 12.8% $CoCO_3$. The microbubbles had a true density of 0.26 g/cm³ and had light blue color.

EXAMPLE G

Pressure-sensitive adhesive Tape 19 was identical to Tape 3 of Example A except that the syrup was made from 30 parts of N-vinyl-2-pyrrolidone and 70 parts of isooctyl acrylate monomers. Comparative Tape 19-C was identical to Tape 19 except omitting the hydrophobic silica. See Table III.

EXAMPLE H

Pressure-sensitive adhesive Tape 20 was made from a syrup prepared as in Example A. After adding 0.07 phr of the carbon black, 4 phr of the hydrophobic silica, and 7 phr of the glass microbubbles, the mixture was employed to provide a cellular pressure-sensitive adhesive membrane as described in U.S. Pat. No. 4,415,615 (Esmay et al.), Typical Tape Making Procedure, column 6, line 31. A 2:1 ratio of Surfactants C and D described in U.S. Pat. No. 4,415,615 were used to froth the syrup. The frothed syrup was coated and polymerized as described in Example A herein above to provide a celluar pressure-sensitive adhesive membrane having a thickness of 1.0 mm.

TABLE III

| TAPE | PIGMENT DYE (phr) | DARKNESS L* | a* | b* | COLOR | T-PEEL (N/dm) | 180° PEEL (N/dm) |
|---|---|---|---|---|---|---|---|
| 13 | 0.04 | 34 | | | DK GREY | 342 | 174 |
| 13-C | 0.04 | 38 | | | DK GREY | 290 | 153 |
| 14 | 0.07 | 27 | | | BLACK | 260 | 105 |
| 14-C | 0.07 | 30 | | | BLACK | 223 | 103 |
| 15 | 0.14 | 39 | 39 | 7 | RED | 278 | 182 |
| 15-C | 0.14 | 41 | 37 | 7 | RED | 267 | 131 |
| 16 | 0.11 | 16 | 41 | 50 | VIOLET | 394 | 131 |
| 16-C | 0.11 | 18 | 41 | 50 | VIOLET | 304 | 162 |
| 17 | 0.5 | 28 | 10 | −40 | BLUE | 374 | 182 |
| 17-C | 0.5 | 34 | 6 | −34 | BLUE | NT | NT |
| 18 | 0.034 | 26 | 1 | −11 | DK BLUE | 333 | 153 |
| 18-C | 0.034 | 30 | 2 | −15 | DK BLUE | 276 | 149 |
| 19 | 0.07 | 34 | | | DK GREY | 503 | 171 |
| 19-C | 0.07 | 36 | | | DK GREY | 427 | 173 |
| 20 | 0.07 | 35 | | | DK GREY | 160 | 105 |

NT = not tested

Each of the tapes of Table III had a Static Shear Value of 70° C. greater than 10,000 minutes.

EXAMPLE I

A series of Tapes 21–25 were made as described in Example A, Tape 3, except different hydrophobic silicas were used and comparative examples were not made. The hydrophobic silicas were:

|  | HYDROPHOBIC TREATMENT | ESTIMATED SURFACE AREA (m²/g) | HYDROPHOBICITY (%) |
| --- | --- | --- | --- |
| "Aerosil" 972 | Dimethyl dichlorosilane | 110 | 70 |
| "Aerosil" 974 | Dimethyl dichlorosilane | 180 | 60 |
| "Cab-O-Sil" N70-TS | Poly(dimethyl siloxane) | 100 |  |
| "Sipernat" D17 | Dimethyl dichlorosilane | 110 | 70 |

Each of these was converted from fumed silica except "Sipernat" D17 (a product of Degussa), which was converted from precipitated hydrophilic silica.

TABLE IV

| TAPE NO. | HYDROPHOBIC SILICA (phr) | DARKNESS L* | T-PEEL (N/dm) | 180° PEEL (N/dm) |
| --- | --- | --- | --- | --- |
| 21 | "972" 2 | 33 | 327 | 148 |
| 22 | "972" 4 | 32 | 342 | 183 |
| 23 | "974" 4 | 33 | 352 | 184 |
| 24 | "N70" 4 | 34 | 317 | 174 |
| 25 | "D17" 4 | 35 | 341 | 175 |

EXAMPLE J

Microbubble-free pressure-sensitive adhesive Tapes 26–29 were prepared from a partially polymerized syrup of 87.5 parts isooctyl acrylate and 12.5 parts acrylic acid to which had been added 0.1 part of "Irgacure" and 0.15 part of the Photoactive s-triazine B described in (Vesley) U.S. Pat. No. 4,330,590. After adding a pigment or dye (as indicated below) to aliquots of the syrup and mixing with an air stirrer, 0.4 phr of hydrophobic silica ("Aerosil" 972) was added and mixed with an air stirrer. Using a conventional knife coater, each mixture was coated between biaxially oriented poly(ethylene terephthalate) films the surfaces of which had low-adhesion coatings, and then irradiated with lamps as described in Example A. The thickness of each of the resulting dense pressure-sensitive adhesive layers was 0.05 mm.

| TAPE | PIGMENT OR DYE | (phr) |
| --- | --- | --- |
| 26 | Quinacridone violet | 0.14 |
| 27 | Pigment A | 0.07 |
| 28 | "Suncure" LB | 0.5 |
| 29 | Crystal violet dye | 0.11 |

Testing of Tables 26–29 (and comparative tapes omitting the silica) is reported in Table V.

TABLE V

| TAPE | DARKNESS L* | a* | b* |
| --- | --- | --- | --- |
| 26 | 46 | 43 | −17 |
| 26-C | 50 | 28 | −15 |
| 27 | 45 |  |  |
| 27-C | 48 |  |  |
| 28 | 36 | 11 | −58 |
| 28-C | 42 | 5 | −49 |

TABLE V-continued

| TAPE | DARKNESS L* | a* | b* |
| --- | --- | --- | --- |
| 29 | 27 | 50 | −69 |
| 29-C | 32 | 42 | −66 |

EXAMPLE K

A thin, dense, microbubble-free pressure-sensitive adhesive Tape 30 was made by dispersing pigment in a 17% solution in toluene-isopropanol of a copolymer of 90 parts of isooctyl acrylate and 10 parts of acrylic acid and mixing in 0.32 part of Pigment A carbon black and then 4 parts of hydrophobic silica ("Aerosil" 972) with an air stirrer. The mixture was coated 0.35-mm thick using a conventional knife coater on a paper backing, the surface of which had a low-adhesion coating. The solvent was removed by heating the coated film in an oven at 70° C. for 10 minutes, resulting in a dried pressure-sensitive adhesive layer 0.05 mm in thickness.

Tape 31 was made in the same way except replacing the carbon black with 0.2 phr of PDI yellow pigment #3277.

Control Tapes 30-C and 31-C were identical except omitting the silica.

TABLE VI

| TAPE | PIGMENT (phr) | COLOR | DARKNESS L* | a* | b* |
| --- | --- | --- | --- | --- | --- |
| 30 | 0.56 | BLACK | 28 |  |  |
| 30-C | 0.56 | BLACK | 31 |  |  |
| 31 | 0.2 | YELLOW | 86 | −5.9 | 58 |
| 31-C | 0.2 | YELLOW | 86 | −7.6 | 64 |

The 180° Peel of each of Tapes 30, 30-C, 31 and 31-C was within the range of 120–140 N/dm or substantially the same as identical tape except containing no pigment or silica.

EXAMPLE L

A pressure-sensitive adhesive Tape 32 was made to be identical to Tape 3 except that to one of its surfaces was transferred a thin, dense, microbubble-free pressure-sensitive adhesive layer of Tape 30 using a hot laminating roll at 71° C.

EXAMPLE M

Pressure-sensitive adhesive Tape 33 was identical to Tape 32 except that its microbubble-free pressure-sensitive adhesive layer contained no carbon black. It had the same dark grey appearance from both faces.

TABLE V

| TAPE NO |  | COLOR | DARKNESS L* | 180° PEEL (N/dm) | T-PEEL (N/dm) |
| --- | --- | --- | --- | --- | --- |
| 32 | Microbubble-free Face | Black | 16 | 197 | 185 |
|  | Microbubble-filled Face | Dark grey | 33 | 160 |  |

TABLE V-continued

| TAPE NO | | COLOR | DARK-NESS L* | 180° PEEL (N/dm) | T-PEEL (N/dm) |
|---|---|---|---|---|---|
| 33 | Microbubble-free Face | Dark grey | 33 | 187 | 185 |
| | Microbubble-filled Face | Dark grey | 33 | 160 | |

EXAMPLE N

Pressure-sensitive adhesive Tape 34 was made as in Example A except that microbubbles made from a copolymer of poly(vinylidine chloride) and acrylonitrile were used in place of the glass microbubbles. The polymeric microbubbles, sold under the trade name "Miralite" 177, were obtained from the Pierce Stevens Chemical Corporation and had a true density of 0.036 g/cm$^3$ and were 10–60 micrometers in diameter (average 30 micrometers). In order to obtain 33% volume of the bubbles, 1.9 parts of "Miralite" 177 were added to 100 parts of the syrup. Also added to 100 parts of the syrup were 0.25 part of Pigment A and 4 parts of hydrophobic silica ("Aerosil" 972). The resulting Tape 34 had an L* of 39. An identical Tape 34-C except for omission of the silica has an L* of 41.

EXAMPLE O

Using a conventional knife coater, onto a low-adhesion surface of a biaxially oriented poly(ethylene terephthalate) film backing was coated a mixture of a partially polymerized syrup of 90 parts isooctyl acrylate and 10 parts acrylic acid, plus 0.1 part of "Irgacure" 651, 0.15 Photoactive s-triazine B of U.S. Pat. No. 4,330,590, and 1.0 part carbon black. Between this microbubble-free coating and an identical film backing was applied, using a roll coater, a microbubble-filled syrup identical to that used in making Tape 4 of Example A. The thicknesses of the two coatings were 0.025 and 0.875 mm, respectively. The two coatings were simultaneously photopolymerized as in Example A to provide Tape 35 of the invention. Tape 35 had a T-Peel of 328 N/dm. The microbubble-free face was black and had an L*=12 and 180° peel of 209 N/dm; the microbubble-filled face of the adhesive was dark grey and had an L*=33 and a 180° Peel of 180 N/dm.

EXAMPLE P

Pressure-sensitive adhesive tape 36 was prepared identically to Tape 2 except the amount of hydrophobic silica was 6 phr and the amount of glass microbubbles was 8 phr. The adhesive layer of Tape 36 had an L*=37, a T-Peel of 370 N/dm, and a 180° Peel of 190 N/dm.

EXAMPLE Q

To a length of Tape 36 was laminated a thin, dense, microbubble-free, solution-polymerized adhesive layer identical to that of Tape 30 of Example K. To the other face of Tape 36 was laminated a layer of pressure-sensitive adhesive which was identical to that of Tape 30 except having no pigment. The resulting composite Tape 37 appeared to be black when viewed from the face to which the pigmented microbubble-free layer had been laminated and appeared to be grey from the face to which the clear microbubble-free layer had been laminated. The grey face of Tape 37 had an L*=37, a 90° Peel of 272 N/dm after a 20 min. dwell, and 90° Peel of 567 N/dm after a 72-hour dwell. Its black face had an L*=12, a 90° Peel of 436 N/dm after a 20-minute dwell, and a 90° Peel of 545 N/dm after a 72-hour dwell.

We claim:

1. A colored acrylic pressure-sensitive adhesive tape comprising a flexible carrier supporting a pressure-sensitive adhesive layer in which is dispersed a pigment or dye plus hydrophobic silica having a surface area of at least 10 m$^2$/g and in an amount comprising by weight from about 2 phr to about 15 phr, wherein said tape has a more intense color than an identical tape in which the adhesive contains no hydrophobic silica.

2. Pressure-sensitive adhesive tape as defined in claim 1 wherein said pigment or dye comprises carbon black.

3. Pressure-sensitive adhesive tape as defined in claim 2 wherein the adhesive layer contains microbubbles and has a thickness of about 1.0 mm, and the carbon black comprises 0.08–0.1 phr of the pressure-sensitive adhesive layer.

4. Pressure-sensitive adhesive tape as defined in claim 1 wherein the surface area of the hydrophobic silica is from 50 to 400 m$^2$/g.

5. Pressure-sensitive adhesive tape as defined in claim 1 wherein the pressure-sensitive adhesive comprises at least one copolymer of monomers comprising (a) acrylic acid ester of nontertiary alcohol and (b) copolymerizable monomer having a polar group.

6. Pressure-sensitive adhesive tape as defined in claim 5 wherein the monomer (a) comprises a major proportion of acrylic acid ester of nontertiary alkyl alcohol, the molecules of which have from 1 to 14 carbon atoms.

7. Pressure-sensitive adhesive tape as defined in claim 6 at least a major proportion of said molecules have a carbon-to-carbon chain of 4–12 carbon atoms terminating at the hydroxyl oxygen atom, said chain containing at least about one-half the total number of carbon atoms in the molecule.

8. Pressure-sensitive adhesive tape as defined in claim 7 wherein the copolymerizable monomer (b) is predominately acrylic acid.

9. Pressure-sensitive adhesive tape as defined in claim 7, having first and second surfaces wherein the copolymerizable monomer (b) at said first surface of the pressure-sensitive adhesive layer is predominantly acrylic acid and at said second surface is predominantly N-vinyl-2-pyrrolidone.

10. Pressure-sensitive adhesive tape as defined in claim 1 wherein the flexible carrier has a low-adhesion surface from which the pressure-sensitive adhesive layer can be transferred.

11. Pressure-sensitive adhesive tape as defined in claim 1 wherein microbubbles are dispersed throughout a core portion of or the entire pressure-sensitive adhesive layer.

12. Pressure-sensitive adhesive tape as defined in claim 11 wherein the microbubbles are glass.

13. Pressure-sensitive adhesive tape as in claim 11 wherein the microbubbles are polymeric.

14. Pressure-sensitive adhesive tape as defined in claim 11 wherein microbubbles are dispersed throughout a core portion of the pressure-sensitive adhesive layer and covering that core portion is a relatively thin, dense, microbubble-free pressure-sensitive adhesive layer containing a pigment of dye.

15. Pressure-sensitive adhesive tape as defined in claim 1 wherein the pressure-sensitive adhesive layer is at least in part celluar.

16. Pressure-sensitive adhesive tape as defined in claim 15 wherein said pressure-sensitive adhesive layer is in part celluar, and the celluar portion covered with a relatively thin, dense pressure-sensitive adhesive layer containing a pigment or dye.

* * * * *

UNITED STATES PATENT AND TRADEMARK OFFICE
CERTIFICATE OF CORRECTION

PATENT NO. : 4,895,745
DATED : JANUARY 23, 1990
INVENTOR(S) : GEORGE F. VESLEY ET AL.

It is certified that error appears in the above-identified patent and that said Letters Patent is hereby corrected as shown below:

Col. 1, line 60, "3,651,972" should be --3,615,972--.
Col. 3, line 62, "Intense" should be --intense--.
Col. 6, line 4-5, "preferred" should be --Preferred--.
Col. 6, line 67, After "plate" add --at--.
Col. 7, line 5, "aluminn" should be --aluminum--.
Col. 7, line 11, After "plate" add --at--.
Col. 7, line 20, "=5" should be -- -5 --.
Col. 8, line 33, "1O" should be --1-O--.
Col. 11, line 37, "films" should be --films,--.
Col. 12, line 63, "TABLE V" should be --TABLE VII--.
Col. 14, line 64, After "as" add --defined--.
Col. 15, line 3, "of" should be --or--.
Col. 15, line 6, "celluar" should be --cellular--.
Col. 16, line 2, In two places, "celluar" should be --cellular--.

Signed and Sealed this

Seventeenth Day of September, 1991

Attest:

HARRY F. MANBECK, JR.

*Attesting Officer*   *Commissioner of Patents and Trademarks*